United States Patent [19]

Horton et al.

[11] E Re. 28,644

[45] Reissued Dec. 9, 1975

[54] METHOD AND MEANS FOR CORROSION PROTECTION OF CABLES EXPOSED TO UNDERGROUND ENVIRONMENTS

[75] Inventors: James B. Horton, Bethlehem; Herbert E. Townsend, Jr., Upper Saucon Township, both of Pa.

[73] Assignee: Bethlehem Steel Corporation, Bethlehem, Pa.

[22] Filed: Jan. 22, 1974

[21] Appl. No.: 435,559

Related U.S. Patent Documents

Reissue of:

[64] Patent No.: 3,637,341
Issued: Jan. 25, 1972
Appl. No.: 888,551
Filed: Dec. 29, 1969

[52] U.S. Cl. ..... 21/2.5 R; 21/2.7 R; 21/61; 166/310

[51] Int. Cl.[2] ..... C23F 11/00; C23F 11/08

[58] Field of Search ..... 21/2.5 R, 2.7 R, 61; 166/310

[56] References Cited

UNITED STATES PATENTS

| | | | |
|---|---|---|---|
| 999,870 | 8/1911 | Randall | 174/14 |
| 1,227,087 | 5/1917 | Steffens | 21/2.5 R UX |
| 1,699,174 | 1/1929 | Whittemore | 57/148 |
| 2,510,771 | 6/1950 | Bond et al. | 21/2.5 R X |
| 2,523,898 | 9/1950 | Carlson | 21/2.5 R X |
| 2,593,057 | 4/1952 | Savoy | 21/2.7 R X |
| 2,654,436 | 10/1953 | Carlisle et al. | 166/310 |
| 2,658,939 | 11/1953 | Greenfield et al. | 174/34 |
| 2,769,921 | 11/1956 | Nahin et al. | 21/2.5 R X |
| 2,770,307 | 11/1956 | Deerdoff | 166/310 X |
| 2,803,259 | 8/1957 | Pesnell | 166/310 X |
| 2,926,066 | 2/1960 | Lew | 21/2.5 R |
| 3,086,069 | 4/1963 | Kolmorgen | 174/11 |
| 3,215,613 | 11/1965 | Lainson | 204/196 |
| 3,234,723 | 2/1966 | Brown | 57/149 |
| 3,298,438 | 1/1967 | Anthony et al. | 166/38 |
| 3,301,277 | 1/1967 | Kelly | 138/114 |
| 3,497,990 | 3/1970 | Jeffries | 21/2.7 R X |
| R23,583 | 11/1952 | Eilerts | 166/310 X |

FOREIGN PATENTS OR APPLICATIONS

| | | | |
|---|---|---|---|
| 293,835 | 8/1929 | United Kingdom | 21/2.5 |

OTHER PUBLICATIONS

"Flexible Rod for Pumping Wells," Petroleum Engineer; 10/68; pp. 40–41.

*Primary Examiner*—Barry S. Richman
*Attorney, Agent, or Firm*—Joseph J. O'Keefe; Charles A. Wilkinson

[57] ABSTRACT

Stranded cable such as flexible pumping strand used for oil wells is protected from deterioration in corrosive underground and underwater environments by jacketing the cable with a plastic sheath and pumping a corrosion-inhibiting liquid having a specific gravity similar to that of the immediate underground environment from the surface through the strand and out the lower end of the strand while maintaining a slight positive pressure within the strand or cable.

28 Claims, 4 Drawing Figures

Fig. 1
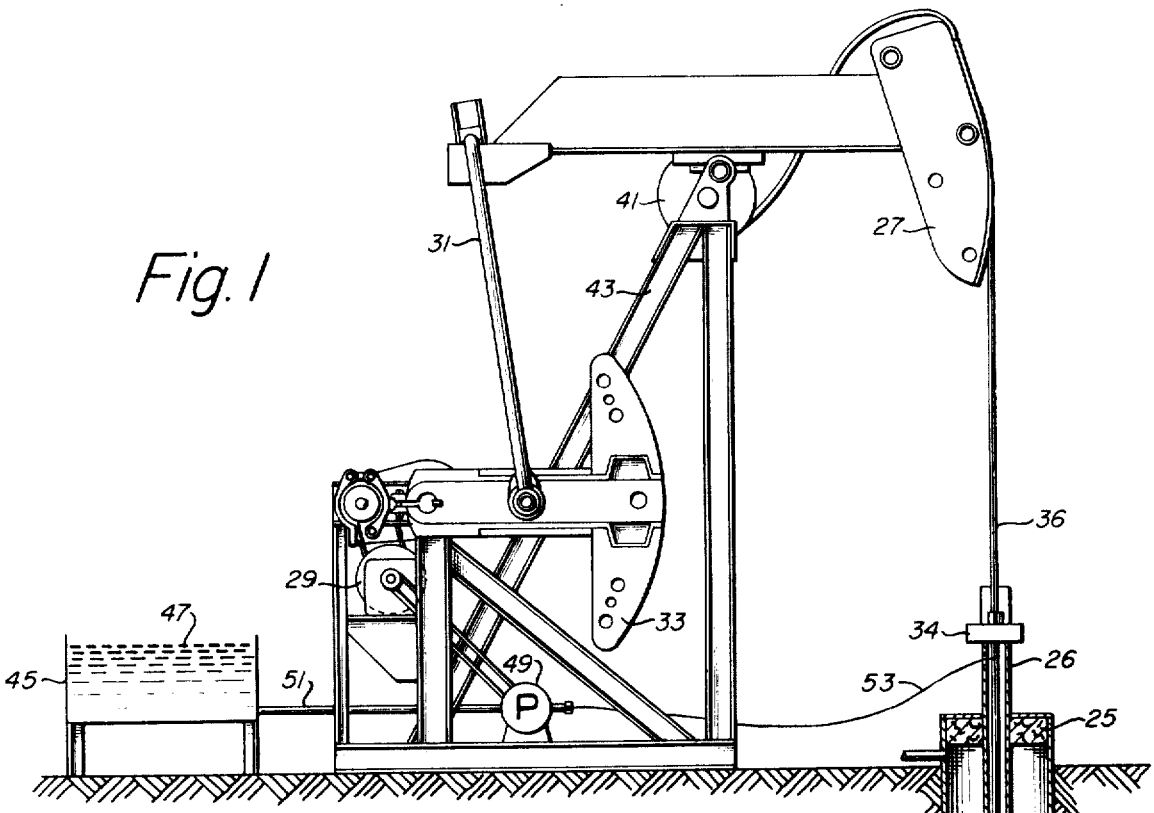
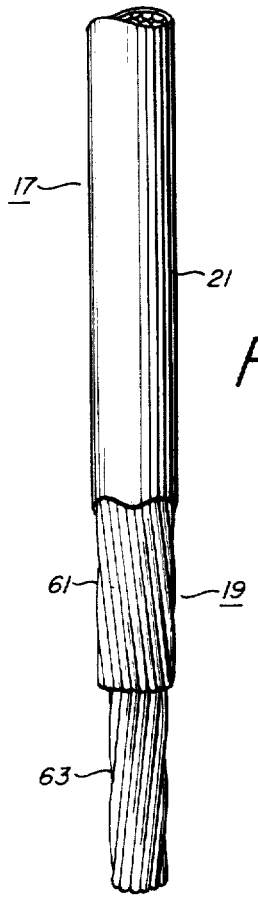
Fig. 4
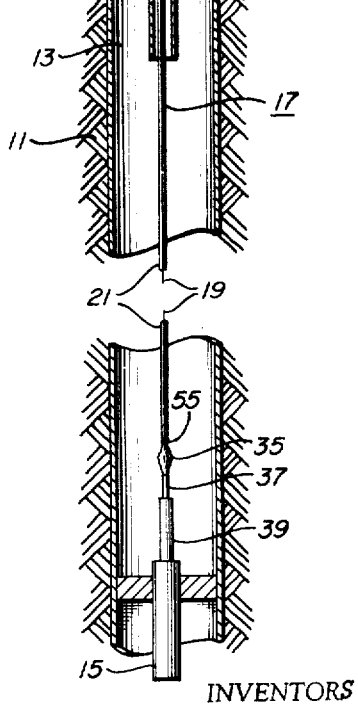
INVENTORS
James B. Horton
Herbert E. Townsend Jr.

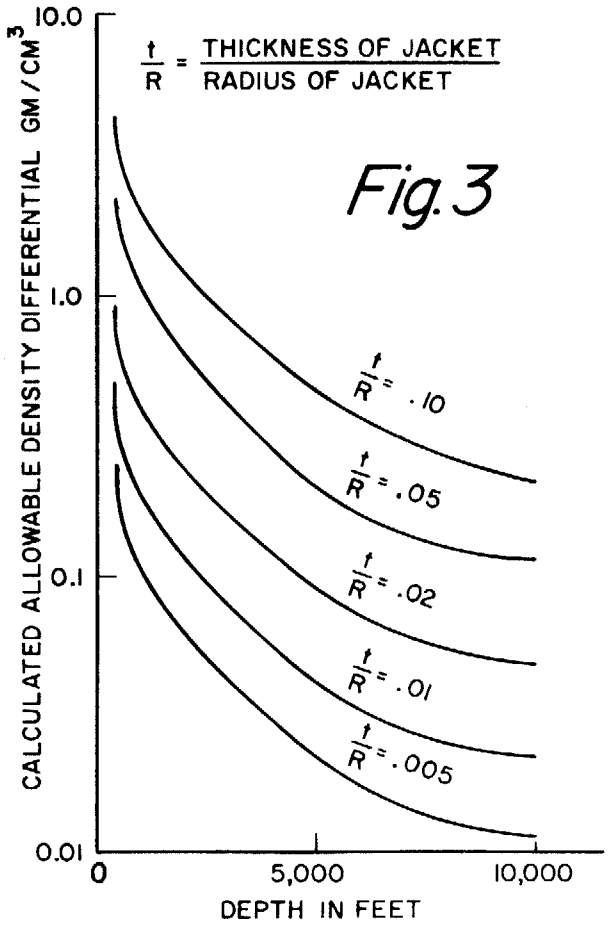
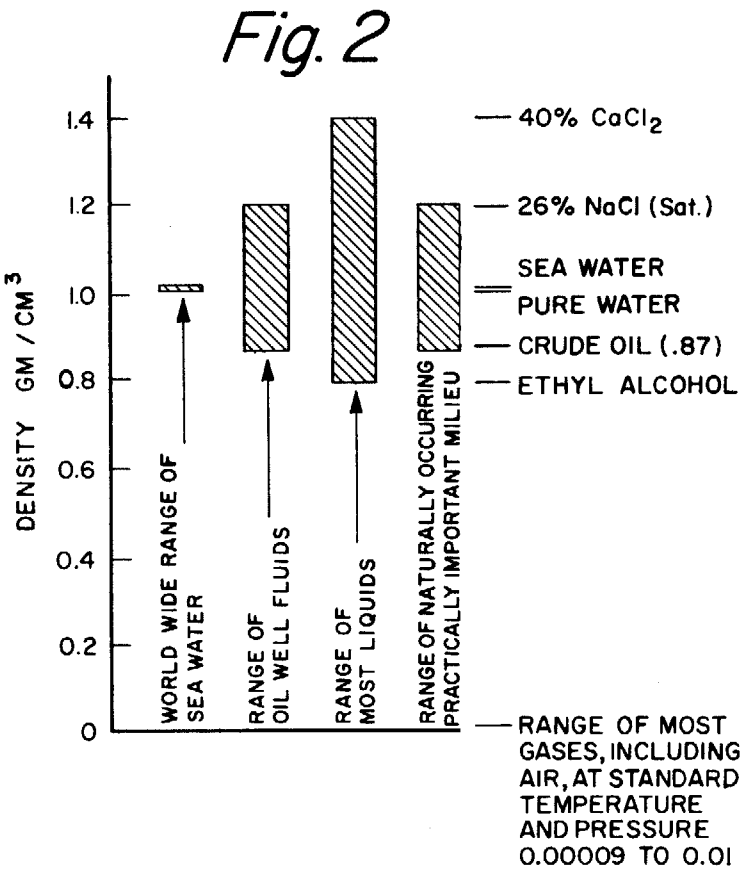
INVENTORS
James B. Horton
Herbert E. Townsend Jr.

METHOD AND MEANS FOR CORROSION PROTECTION OF CABLES EXPOSED TO UNDERGROUND ENVIRONMENTS

Matter enclosed in heavy brackets [ ] appears in the original patent but forms no part of this reissue specification; matter printed in italics indicates the additions made by reissue.

BACKGROUND OF THE INVENTION

The invention relates to the protection of wire cable including both wire strand and rope from corrosive environments.

Steel strand and rope used in subatmospheric environments such as under the sea and within deep oil wells and the like is frequently subject to extremely rapid and severe corrosion. Such corrosion may take the form of corrosion fatigue or stress corrosion, hydrogen sulphide cracking and other specialized forms of corrosion as well as general surface corrosion. Such corrosion necessitates frequent inspections and replacements of the strand or rope, usually at considerable expense and inconvenience due to interrupted operations. The corrosive brine frequently present in oil wells, for instance, may make replacement necessary after only a month or two of operation of the strand in a well. Even more serious, certain forms of corrosion such as stress corrosion and the like may be difficult to detect by mere inspection and if not detected may cause sudden hazardous failures of the strand or rope.

Various schemes for protecting such ropes and strands from the corrosive environment have been tried, notably encapsulation of the strand and rope in various plastics and combinations of plastics. Unfortunately, plastics in general, while being in many cases fairly corrosion resistant themselves, and substantially waterproof over short periods, are over longer periods significantly permeable to many fluids and other substances including a great number of corrosive substances. Consequently while a plastic coating is often a very effective corrosion protection for short periods, if the strand or rope is continuously immersed in the corrosive environment over substantial periods of time considerable quantities of corrosive substances may reach the metallic portions of the cable. Corrosion inhibitors may occasionally be enclosed with the strand or rope within the plastic encapsulation but such corrosion inhibitors are soon exhausted by the sheer quantities of corrosive substances which may make their way through the plastic coating over a period of time. In addition the normal permeability to the environment of the plastic coating may be aggravated by injuries such as abrasions and minor ruptures of the plastic coating which accelerate the admittance of the corrosive environment. Unavoidable manufacturing defects such as holidays or the like in the plastic coating may also at times cause serious difficulties.

The present invention obviates the foregoing difficulties of other corrosion protective systems.

SUMMARY OF THE INVENTION

The present invention protects metal cable such as wire strand and rope from highly corrosive environments by the provision of a plastic or flexible jacket about the surface of the cable and the introduction into and through the cable in the interstices between the wires of a corrosion-inhibiting liquid having a specific gravity substantially at least as great as or similar to the specific gravity of the principal fluid component of the environment at a positive pressure with respect to the environment and at a rate sufficient to replace an amount of the corrosion-inhibiting liquid which is allowed to escape from the terminal end of the cable and along any other permeable portions of the cable. In this manner the corrosion inhibitor is continuously renewed so that the metal surfaces are continuously protected by fresh corrosion inhibitor while the entrance of corrosive substances into the cable is opposed by the outflow of the corrosion inhibiting fluid.

BRIEF DESCRIPTION OF THE DRAWINGS

FIG. 1 schematically shows a corrosion inhibiting system according to the present invention.

FIG. 2 is a chart illustrating the normal expected specific gravities, or densities, of different naturally occurring environments.

FIG. 3 is a graph illustrating allowable differentials between the specific gravities, or densities, of the environment and corrosion-inhibiting liquids.

FIG. 4 shows an enlarged and partially cutaway section of a preferred form of strand for use in the present invention.

DESCRIPTION OF THE PREFERRED EMBODIMENTS

In FIG. 1 is shown a schematic view of an oil well 11 including a well casing 13, a differential pressure or other suitable pump 15 positioned at the bottom of said casing to pump the oil up to the surface through the casing, a flexible pumping strand 17 comprised of individual steel wires 19 and a nylon plastic jacket 21 covering the strand. The flexible pumping strand 17 passes at the wellhead 23 through the usual packing 25 preferably being protected at this point by a so-called hollow polished rod 26 which is secured to the strand and reciprocates in the packing 25 as the flexible pumping strand 17 is reciprocated by the movements of a horsehead 27 operated at the surface by motor 29 through connecting rod 31 connected to flyweight arm 33. The reciprocation of flexible pumping strand 17 serves to operate pump 15 to which the flexible pumping strand is attached through a swaged fitting 35, shear release 37 and connecting pony rods 39. Hollow polished rod 26 and strand 17 may preferably be supported from horsehead 27 by carrier bar 34 through bridles 36. Excess flexible pumping strand 17 is reeled on a reel 41 secured to the supporting framework 43 upon which horsehead 27 is pivoted.

It will be understood that the well shown in FIG. 1 may be several thousand feet deep and will be filled with crude oil which is in many cases saturated with many highly corrosive salts and gaseous substances some in the oil and some or most dissolved in water or brine mixed with the crude oil. Different wells will contain different corrosive substances which may be predominantly acid or alkali and otherwise vary depending upon the nature of the surrounding geological strata.

Not only is the well 11 likely to be filled with corrosive substances but it is also subjected, particularly in the lower portions, to very high pressures due to the great height of superimposed liquid in the well. These pressures not only aggravate the permeation of the plastic jacket 21 with the corrosive substances but may also tend to force any corrosion inhibitors originally ontained in the strand away from the areas of greatest ressure. The usual increase in temperature of about 1° '. for every increase in depth of 100 feet also aggraates the permation of corrosive substances through ıe jacket.

At the surface adjacent to horsehead 27 and motor 9 is a reservoir 45 of a suitable liquid corrosion inhibi- ɔr 47. Corrosion inhibitor 47 may be composed of ɔme inert liquid which will shield the metal surfaces of ıe wires from corrosive substances or may comprise a ıbstance which will oppose corrosion of the wires by ɜacting itself with the corrosive substances or with orrosion products of these substances thus opposing ırther corrosion. It may also comprise a polar subtance which clings to and coats the wires of the strand hielding them from contact with corrosive substances. 'he type of corrosion inhibitor must be chosen to opose the form of corrosion most prevalent in the particlar well. Some of the most suitable corrosion inhibitıg substances for use with the present invention when : is used in oil wells are aqueous solutions of sodium or ıther borates, chromates, carbonates and nitrites. This ıst, however, is by no means exclusive.

For general corrosion protection in water, for intance, sodium hydroxide, sodium phosphate, various odium silicates, sodium borates, sodium benzoates, solium cinnamate, chromates, nitrites, molybdates and ungstates have all been reported as effective. For corosion in crude oil the use of formaldehyde, chromates, odium bicarbonate, sodium silicate, cyanamides, arenic compounds, aliphatic fatty acid derivatives, imidızolines, rosin derivatives and other substances have ɔeen reported to be effective. Corrosion fatigue has ɔeen reported counteracted by dodecyl alcohol, dodecyl alcohol and water, octyl alcohol, dodecylamine, ocadecylamine, n-hexadecane and other substances. ɜtress corrosion cracking in $H_2S$ has been found to be 'etarded or substantially eliminated in formaldehyde, ımmonia and amines while fretting corrosion has been lecreased by the use of molybdenum sulphide and low-ɜiscosity oil. Combinations of these and other corroıion-inhibiting materials can effectively be comɔounded to meet the many and special corrosion probems which are posed by particular corrosive environments.

For deep marine environments such as are encountered by deep sea mooring cables and the like the corrosion-inhibiting substances should be cheap and effective in small quantities or concentrations, or, alternatively, require only small amounts of corrosion inhibitor to neutralize the corrosion encountered in the environment. Sealants included within the corrosion-inhibiting liquid may effectively decrease the amount of corrosion inhibitor used by aiding in sealing small abrasions and other imperfections in the cable jacket.

For use in oil well environments the corrosion inhibitor should not be significantly detrimental, at least at low concentrations, to further refining operations to be carried on with respect to the crude oil and should preferably be fairly cheap and conveniently available. The specific gravity of the corrosion inhibitor must also be fairly close to the specific gravity of the oil and water mixture in the well and will preferably have a slightly greater specific gravity. An aqueous solution or emulsion of a corrosion-inhibiting agent thus will often serve very satisfactorily in a well filled with a mixture of crude oil and water or even in a well filled only with corrosive crude oil as its specific gravity will be slightly greater than the surrounding oil mixture with the advantages which will hereafter become evident. Gases will not be suitable as corrosion inhibitors in deep subatmospheric environments because of their low specific gravity or density. Liquid corrosion inhibitors are also likely to be more effective than gases in excluding other liquid corrosive substances from a cable particularly where the corrosive substances from the external environment are subjected to a considerable head or pressure. Emulsions of oil and water or water and other liquids may be effective to compound a liquid vehicle for dissolved corrosion-inhibiting substances close to the density of the surrounding corrosive environment.

A pump 49 located adjacent to reservoir 45 and connected by pipe 51 with the reservoir is operated by a belt connection to motor 29, which motor functions in the first instance principally to operate horsehead 27. In the alternative, pump 49 may be operated by suitable connections to horsehead 27 or by an independent motor. Pump 49 serves to introduce corrosion-inhibiting liquid 47 from reservoir 45 into flexible pumping strand 17 through tubing 53 connected to flexible pumping strand 17 at any suitable location such as, for instance, above wellhead 25 and below carrier bar 34 as shown in FIG. 1 and force it with a slight positive pressure towards the termination of strand 17 at pump 15 at the bottom of well 11. The corrosion inhibitor 47 could also be introduced into the extreme upper end of the flexible pumping strand 17. Preferably there is provided a small exit orifice 55 near the termination of strand 17 in fitting 35 secured to pony rod 39. Orifice 55 serves as an outlet for corrosion inhibitor liquid 47 which has passed through the strand 17. There is thus maintained a slight but steady flow through the strand so that fresh inhibitor will always be present within the strand *continuously bathing the component wires of said strand in corrosion inhibiting liquid.* If the plastic jacket 21 is permeable enough to the corrosion inhibitor along its length the orifice 55 may not be necessary to maintain an adequate flow of the inhibitor through the strand, or alternatively, if the plastic is not very permeable to the particular corrosion-producing substances in the well a fairly small flow of inhibitor through the cable may be satisfactory. In either event insufficient corrosion inhibitor will be discharged into the crude oil to significantly affect subsequent refining operations.

If the corrosion inhibitor liquid has a higher specific gravity than the surrounding fluid medium in the oil well the weight of the liquid head through the strand 17 will aid in establishing sufficient flow through the strand. In a deep well, however, the specific gravity cannot be significantly greater than the specific gravity of the environment, else the weight of the column of corrosion inhibitor within the strand may result in such a high positive pressure within the strand near the bottom of the well as to overcome the strength of the plastic jacket 21 causing ballooning, rupture, or other damage to the jacket. On the other hand, if the specific gravity of the corrosion inhibiting liquid is significantly less than the specific gravity of the surrounding environment, fluid pump 49 will be required to apply a high positive pressure to the corrosion-inhibiting liquid 47 to counteract the high pressures in the deeper portions of the well where the pump 15 is located. High positive pressures near the top of the strand where the external pressure is less, however, may cause the plastic outer jacket to balloon and eventually fail in these upper portions. It will thus be seen that when a plastic-jacketed pumping strand or other flexibly jacketed cable is to be used in deep subatmospheric environments with a continuously renewed flow of corrosion inhibitor it is necessary that the specific gravity of the corrosion inhibitor be substantially similar to and preferably at least as great as the specific gravity of the immediately surrounding environmental fluid. Preferably the specific gravity of the corrosion-inhibiting liquid will be somewhat but not too much greater than that of the surrounding environment. Otherwise it would be necessary to provide some form of armored casing to contain the differential pressures. Thus the use of fluids such as inert or reducing gases as corrosion inhibitors in subatmospheric applications below either the surface of the land or of the sea is not practical at any significant depth. It is absolutely essential in a practical deep application corrosion system that the specific gravity of the corrosion-inhibiting liquid be substantially the same as or at least not differ greatly from that of the surrounding fluid medium. In most instances the corrosion-inhibiting liquid will have a specific gravity of about 0.85 to 1.2 and more usually from approximately 0.95 to 1.05 or even 1.10 since the principal surrounding fluid in both the sea and in most deep wells is comprised principally of either crude oil, crude oil and water thus dissolved salts, or water in the liquid state with various dissolved salts. In many cases it may be desirable to have the inhibitor liquid somewhat more dense than the surrounding medium in order to compensate for head loss due to flow resistance through the strand. It must be strongly stressed, however, that the exact specific gravity, or density, of corrosion fluid to be used, including any pumping heads for overcoming densities less than that of the environment, will ultimately be selected so that the differential density of the corrosion inhibitor with respect to the environment will avoid ballooning, rupture or other damage to the plastic jacket for the length of strand involved. Thus it will be seen that the density difference between the corrosion inhibitor and the surrounding medium may be allowably greater for shorter strands than for longer strands. A fairly evenly matched density differential is also useful in saving energy in pumping the corrosion-inhibiting fluid to great depths.

FIG. 2 is a bar graph showing the range of specific gravities — expressed as the density of the various substances in grams per cubic centimeter — which may be expected to be encountered in subsurface applications. For use in the sea the range of expected normal specific gravities will be from about 1.01 to 1.02. In oil wells the possible range of environmental specific gravities will be from approximately 0.87, the specific gravity of substantially pure crude oil, to 1.2, the specific gravity of a 26 percent saturated sodium chloride or brine solution. Normally, of course, the specific gravity of the fluid or environment encountered in an oil well will lie well within the more central portions of this range, usually within a range of 0.95 to 1.05.

The range of specific gravities for most liquids will range anywhere from 0.8, the specific gravity of ethyl alcohol, to 1.4, the specific gravity of a 40 percent calcium chloride solution. It is, of course, unlikely that any naturally occurring densities or specific gravities as low as that of ethyl alcohol will be encountered in subsurface environments. It is not impossible, however, to encounter subsurface environments having a specific gravity of up to or even more than the specific gravity of a saturated solution of sodium chloride, for instance, in deep salt mine pumping operations.

FIG. 3 is a graph showing the allowable density differences for strands of various lengths or depths calculated for five different ratios of T/R, or the thickness of a nylon coating on the strand divided by the radius of the strand.

These calculations are based on the formula $$\sigma > lgR/T \times \Delta D$$

where $\sigma$ = the strength of the plastic material of the jacket
l = the length of strand to be used
g = the gravitational constant
R = the radius of the strand
T = the thickness of the plastic jacket
$\Delta D$ = the difference in density between the environment and the corrosion inhibiting liquid to be used It will be recognized that in order to avoid damage to the jacket of the strand it is absolutely essential that the difference in density between the environment and the corrosion-inhibiting liquid shall not exceed the allowable difference calculated from the strength of the jacket and the depth of well or length of strand to be used. Preferably, of course, the difference in densities will be arranged to be much less in order to provide an acceptable safety factor.

In addition, it is very desirable that the density, or specific gravity, of the corrosion inhibitor be somewhat greater than that of the environment in order to aid in overcoming head loss or frictional losses in passage of the corrosion-inhibiting liquid through the strand but even more importantly to enable continued operation of the corrosion protection system if the plastic jacket is breached at a point above the bottom of the strand. If the jacket should be breached through some physical or other means between the top and the bottom of the strand and the specific gravity, or density, of the corrosion inhibitor is greater than that of the environment some of the corrosion inhibitor will escape from the breach but the remainder will continue down into the lower portions of the strand. If, however, the specific gravity, or density, of the corrosion inhibitor is less than that of the environment, even though within the allowable limits to prevent damage to the jacket, most, if not all, of the corrosion inhibitor will tend to escape from the breach and the environmental liquid will tend to enter the strand at the breach and collect in the lower portions of the strand completely defeating the purpose of the corrosion inhibitor.

It will be seen from the preceding discussion also that if the specific gravity, or density, of the corrosion inhibitor is somewhat greater than that of the environment not only does the increased specific gravity aid in overcoming the head or friction loss of the passage of the corrosion fluid through the strand but this head or friction loss decreases the pressure at the bottom of the strand thus in effect offsetting the density difference between the environment and the corrosion inhibitor and allowing somewhat greater density differences than would otherwise be suitable.

On the other hand if the specific gravity, or density of the corrosion-inhibiting liquid is less than that of the environment, even though within the normally allowable ranges of difference, because a greater pumping pressure from the pump 49 will be necessary to overcome the head or frictional losses in the strand, there will be a greater tendency for ballooning of the jacket ıear the top of the strand than would normally be ex-ıected from the mere density difference and the allow-ble ranges of density difference will be correspond-ıgly effectively decreased.

It will be seen, therefore, that not only is it most im-ıortant that the density, or specific gravity, of the cor-osion-inhibiting liquid be substantially similar to that f the environment but it is most preferable in practi-ally every case that the specific gravity, or density, of he corrosion inhibitor be somewhat greater than that f the environment though still within the normally al-ɔwable limits.

It has been found that contrary to normal expecta-ions a corrosion-inhibiting fluid can be pumped either ıechanically or by pressure induced by differential pecific gravities through long lengths of jacketed wire ope, strand and cable without detrimental loss of pres-ure or flow volume. Since the interstices between the ıires of wire strand extend for long distances through he strand without interruption relatively free move-ıent of the liquid through the strand is possible. Paral-ɜl wire strand is particularly satisfactory in this respect s the interstices in parallel wire strand extend substan-ially straight along the longitudinal extend of the trand. The plastic jacket will often be sufficient to bind he wires of the parallel wire strand together into a uni-ary strand, although additional binding may be used. ıs a practical matter, however, and for applications ıhere the strand is to be subjected to considerable tress and movement it may be found more satisfactory o provide a fairly long lay, or slight twist, to the strand n order to bind the individual wires together and pro-ide a practical degree of flexibility. The long lay will ıot significantly decrease the flow of the corrosion-nhibiting liquid through the strand. Such strand may ıe fairly characterized as "substantially parallel wire trand." For some applications, a so-called "bundled trand" wherein the wires are not compactly seated to-;ether but are loosely bound together by an outer bind-ng of some suitable form such as a plastic jacket is also ery suitable for use in the present invention and can be onsidered to be a variant of parallel wire strand. While . "substantially parallel wire strand" is most effective or use in the present invention, a normally stranded or wisted strand or cable will also be satisfactory particu-arly for intermediate lengths of cable up to several housand feet in length. Likewise a wire rope formed rom individual twisted wire strands may also be used. n all cases, however, the individual wires of the strand, able or rope should not be compacted together to uch a degree that the individual wires are deformed to ıny great extent as the interstices between the wires vould then be constricted and would present a signifi-ant impediment to the free flow of the corrosion inhib-tor through the strand. It has been found that if there s a lay of any degree in the wires of the strand it is very ıdvantageous to provide a differential lay to the various ayers of wire of the strand, that is to say provide differ-nt lays in the various layers of wires as, for instance, by ıaving opposite lays in adjacent layers of wires, as this ;reatly increases the voids in the strand and provides nore unrestricted flow of the corrosion inhibitors.

FIG. 4 shows in partial cutaway section a preferred orm of twisted wire strand for the present invention. This strand has a long lay just sufficient to hold the vires of the strand together and provide sufficient flexi-ɔility for a flexible pumping strand. This construction ɔrovides fairly straight passageways between the wires of the strand for the free passage of corrosion-inhibiting liquid *which continuously bathes the component wires of the strand.* Such strand may be fairly characterized as "substantially parallel wire strand" though technically it is not parallel wire strand as conventionally understood. Preferably the strand 17 will have several adjacent layers 61 and 63 of wires 19 having differential lays with respect to each other to further increase the flow rate of corrosion inhibitors.

It may, in some instances, be sufficient or desirable to operate the pump 49 which pumps the corrosion-inhibiting fluid into the strand only intermittently to periodically flush out the strand. Any suitable timing *control* device can be arranged to effectuate intermittent operation of the pump.

The corrosion-inhibiting fluid may also be formulated, in some instances, and particularly for use in deep marine environments, to coagulate as it seeps from any abrasion or other defect in the jacket of the strand to supply a self-sealing or healing effect at coating defects.

If desired a pressure-detecting means may be mounted to detect the normal pressure of the corrosion inhibitor within the strand 17 near the upper portion thereof or within tubing 53. If a major break then occurs in the plastic jacket 21 along the strand the resultant drop in pressure will indicate that a break has occurred. Any suitable alarm means may be rigged with the pressure indicator to give an alarm when a pressure drop occurs. As an alternative the pressure may be maintained constant, particularly when a difference in the densities is utilized to move the corrosion inhibitor through the strand, and the volume measured to detect any significantly increased flow rates.

If desired, the corrosion inhibitor may be directed from the end of the strand into some associated apparatus at the end of the strand such as pump 15 in FIG. 1 before being exhausted to the environment. In this manner sensitive parts of the associated apparatus may be protected from corrosion. The corrosion inhibitor may also comprise some lubricating substance which may lubricate apparatus located at the end of the strand such as pump 15.

In some instances it may be desirable to provide a continuous intentional defect or void in the strand such as by leaving out a wire from a normal layer of wires in order to provide an additional path for the flow of corrosion inhibitor through the strand.

Other plastics than nylon may be used for the outer jacket for particular applications such as, for example, polypropylene or polytetrafluoroethylene. In some instances also it may be desirable to provide a metallic or other armoring for the jacket to increase its abrasion resistance and the like.

We claim:

1. A corrosion protection system for the protection of cables in subatmospheric corrosive environments comprising:

a. a cable composed of a collection of individual wires, b. a flexible outer jacket surrounding said cable and partially permeable to corrosion inhibiting liquid at least at the terminal end, c. a supply of a liquid having a specific gravity substantially similar to the specific gravity of the [ fluid constituents ] *surrounding fluid medium* of the corrosive environment and being corrosion inhibiting with respect to said environment, and d. means to introduce said liquid into one end of said cable within said outer jacket at a rate sufficient to maintain a small positive pressure in said cable with respect to said corrosive environment and to replace portions of said liquid passing from within said jacketed cable at least at the opposite terminal end of said cable.

2. A corrosion protection system for the protection of cables in subatmospheric corrosive environments according to claim 1 additionally comprising:

a. reservoir means to contain said supply of corrosion-inhibiting liquid; and b. pump means to forcibly introduce said corrosion-inhibiting liquid from said reservoir means into said jacketed cable.

3. A corrosion protection system for the protection of cables in subatmospheric corrosive environments according to claim 1 wherein the specific gravity of the corrosion-inhibiting liquid is at least as great as the specific gravity of the corrosive environment.

4. A corrosion protection system for the protection of cables in subatmospheric corrosive environments according to claim 2 wherein the flexible outer jacket is formed of plastic.

5. A corrosion protection system for the protection of cables in subatmospheric corrosive environments according to claim 1 wherein the liquid of (c) has a specific gravity of between 0.85 to 1.2.

6. A corrosion protection system for the protection of cables in subatmospheric corrosive environments according to claim 5 wherein the specific gravity of the corrosion-inhibiting liquid is greater than the specific gravity of the corrosive environment.

7. A corrosion protection system for the protection of cables in subatmospheric corrosive environments according to claim 6 wherein said cable has several layers of wires with a differential lay between layers.

8. A corrosion protection system for the protection of cables in subatmospheric corrosive environments according to claim 6 wherein said cable comprises at least a semiparallel wire strand and is jacketed with a flexible nylon jacket.

9. A corrosion protection system for the protection of cables in subatmospheric corrosive environments according to claim 8 wherein said cable has several layers of wires with a differential lay between layers.

10. A corrosion protection system for the protection of cables in subatmospheric corrosive environments according to claim 1 wherein said liquid of (c) has a specific gravity of between 0.95 and 1.05.

11. A corrosion protection system for the protection of cables in subatmospheric corrosive environments according to claim 6 wherein the specific gravity of the corrosion-inhibiting liquid is greater than the specific gravity of the corrosive environment.

12. A corrosion protection system for the protection of cables in subatmospheric corrosive environments according to claim 11 wherein said cable is attached to secondary apparatus into which said corrosion-inhibiting liquid is discharged in order to additionally protect said secondary apparatus from corrosion.

13. A corrosion protection system for the protection of cables in subatmospheric corrosive environments according to claim 11 wherein said cable has several layers of wires with a differential lay between layers.

14. A corrosion protection system for the protection of cables in subatmospheric corrosive environments according to claim 11 wherein said cable comprises at least a semiparallel wire strand and is jacketed with a flexible nylon jacket.

15. A corrosion protection system for the protection of cables in subatmospheric corrosive environments according to claim 14 wherein said cable has several layers of wires with a differential lay between layers.

16. A corrosion protection system for protection of cables *disposed with portions of the cables located at substantially different levels* in subatmospheric corrosive environments comprising:

a. a cable composed of a collection of individual wires;

b. a flexible outer jacket surrounding said cable, *said outer jacket being at least partially permeable to liquids;* c. a supply of corrosion-inhibiting liquid having a density selected *to be substantially similar to the specific gravity of the surrounding fluid medium of the corrosive environment in which the cable is to be used in order* to avoid ballooning of the jacket for the length of cable involved; and d. means to *regularly* introduce said liquid into the top of said cable within said outer jacket at a rate sufficient to maintain a small positive pressure in said cable with respect to an outer corrosive environment *to continuously bathe the component wires of said cable in said corrosion inhibiting liquid* and to replace portions of said liquid passing from said jacketed cable [ at least at the opposite terminal end of said cable ].

17. A method for protecting plastic-jacketed cables from corrosive subatmospheric environments *where the cables are to be disposed with portions of the cable at substantially different subatmospheric levels in said corrosive environments* comprising *regularly* introducing a corrosion-inhibiting liquid having a specific gravity *selected to be substantially similar to the specific gravity of the surrounding fluid medium of the corrosive environment in which the cable is used and* substantially at least as great as the [ principal fluid ingredient ] *surrounding fluid medium* of said corrosive environment into a portion of said cable at a rate sufficient to maintain a small positive pressure in said cable with respect to said corrosive environment *and continuously bathe the component wires of said cable in said corrosion inhibiting liquid* and to replace portions of said corrosion-inhibiting liquid passing from within said jacketed cable at least *through an opening extending through the plastic jacket* at an opposite terminal end of said cable.

18. A method of protecting plastic-jacketed cables from corrosive subatmospheric environments according to claim 17 wherein said corrosion-inhibiting liquid is introduced into said cable intermittently.

*19. A corrosion protective system for protection of cables in subatmospheric corrosive environments where the cables are disposed with portions of the cables located at substantially different subatmospheric levels comprising.*

*a. a cable composed of a collection of individual wires.*

*b. a flexible outer jacket surrounding the said collection of wires,*

*c. a supply of corrosion-inhibiting liquid having a density substantially similar to the specific gravity of the surrounding fluid medium of the corrosive environment in which the cable is to be used and selected to avoid ballooning of the jacket for the head of liquid pressure developed in the length of cable used in the subatmospheric corrosive environment, and*

*d. means to regularly introduce said liquid into the top of said cable within said outer jacket to maintain a small positive pressure in said cable with respect to an outer corrosive environment and continuously bathe the component wires of said strand in said corrosion inhibiting liquid and to replace any portions of the liquid escaping from said jacketed cable.*

*20. A corrosion protection system according to claim 19 wherein the means for introducing the corrosion-inhibiting liquid into the cable is provided with a timing control device to effectuate introduction of said liquid intermittently into said cable.*

*21. A corrosion protection system according to claim 20 wherein the corrosion-inhibiting liquid has a specific gravity greater than that of the surrounding environment.*

*22. A corrosion protection system according to claim 19 wherein the means for introducing the corrosion-inhibiting liquid constitutes a liquid pumping means.*

*23. A corrosion protection system according to claim 22 wherein the pumping means is provided with a timing control device to effectuate introduction of said corrosion inhibiting liquid into said cable intermittently.*

*24. A corrosion protection system according to claim 23 wherein the corrosion-inhibiting liquid has a specific gravity greater than that of the surrounding environment.*

*25. A method for protecting plastic-jacketed cables from corrosive subatmospheric environments where the cables are positioned with portions of the cables located at substantially different levels in the corrosive environments comprising regularly introducing a corrosion-inhibiting liquid having a specific gravity substantially similar to the specific gravity of the surrounding fluid medium of the corrosive environment in which the cable is to be used to avoid ballooning of the jacket for the head of liquid pressure developed in the length of cable used in the subatmospheric environment, into a portion of the cable at a rate sufficient to maintain a small positive pressure in said cable with respect to said environment and continuously bathe the component wires of said strand in said corrosion-inhibiting liquid and to replace any portions of said corrosion-inhibiting liquid escaping from said cable.*

*26. A method for protecting plastic-jacketed cables according to claim 25 wherein the corrosion-inhibiting liquid is introduced into said cable intermittently.*

*27. A method for protecting plastic-jacketed cables according to claim 26 wherein the corrosion-inhibiting liquid has a specific gravity greater than that of the surrounding environment.*

*28. A method for protecting plastic-jacketed cables according to claim 27 wherein the corrosion-inhibiting liquid is introduced into said cable intermittently.*

* * * * *